No. 800,909. PATENTED OCT. 3, 1905.
C. P. EBERSOLE.
CONTROLLER REGULATOR.
APPLICATION FILED JULY 23, 1902. RENEWED MAY 5, 1904.

3 SHEETS—SHEET 1.

Witnesses:
Ira D. Perry
Robert Lewis Ames

Inventor:
Cyrus P. Ebersole
by Jones & Addington
Attys.

No. 800,909. PATENTED OCT. 3, 1905.
C. P. EBERSOLE.
CONTROLLER REGULATOR.
APPLICATION FILED JULY 23, 1902. RENEWED MAY 5, 1904.

3 SHEETS—SHEET 2.

Witnesses:
Ira D. Perry
Robert Lewis Ames,

Inventor:
Cyrus P. Ebersole
by Jones & Addington
Attys.

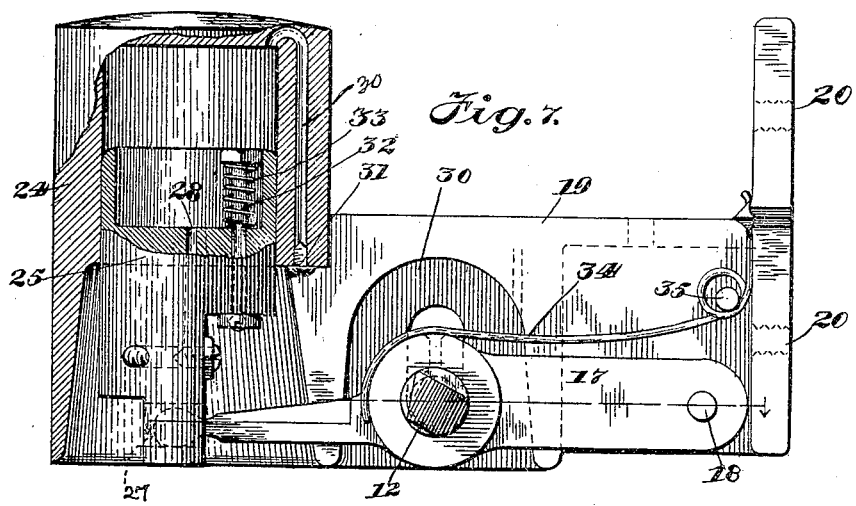
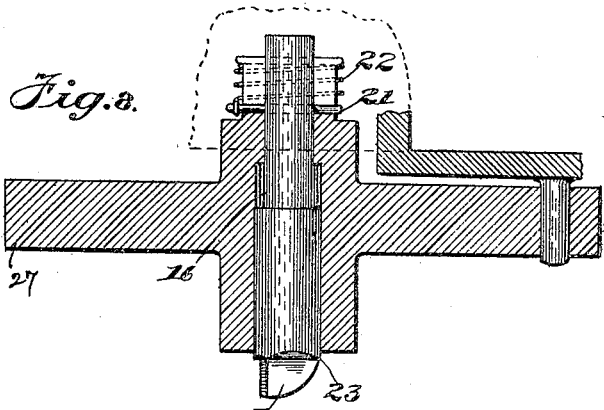
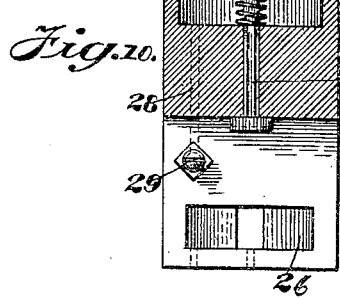
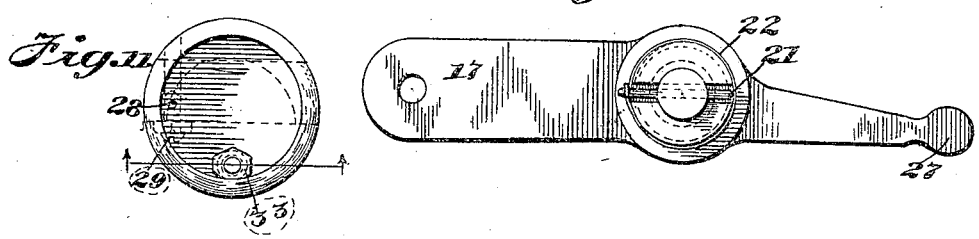

UNITED STATES PATENT OFFICE.

CYRUS P. EBERSOLE, OF KEOKUK, IOWA, ASSIGNOR TO ELECTRICAL DEVICES COMPANY, OF KEOKUK, IOWA, A CORPORATION OF IOWA.

CONTROLLER-REGULATOR.

No. 800,909. Specification of Letters Patent. Patented Oct. 3, 1905.

Application filed July 23, 1902. Renewed May 5, 1904. Serial No. 206,578.

*To all whom it may concern:*

Be it known that I, CYRUS P. EBERSOLE, a citizen of the United States, residing at Keokuk, in the county of Lee and State of Iowa, have invented a certain new and useful Improvement in Controller-Regulators, of which the following is a full, clear, concise, and exact description, reference being had to the accompanying drawings, forming a part of this specification, My invention relates to improvements in controller-regulators such as are used on street-car controllers or in analogous relations for preventing the motorneer from operating the controller for cutting out the resistance in the armature-circuit of the motor or motors too rapidly, and thereby preventing an excess flow of current and the attending waste of energy, besides avoiding injury to the apparatus.

In accordance with my invention, which has been worked out in commercial form, I provide a wheel upon the controller-shaft having a zigzag slot or groove in its periphery, together with a suitably-governed movably-mounted dog adapted to coöperate with said slot, whereby the speed of operation of the controller is regulated to any desired extent.

My invention has particularly in view the provision of a thoroughly practical device that is simple and consists of few parts, that is strong and durable and not likely to get out of order, and one that is convenient and efficient in operation.

Figure 1:
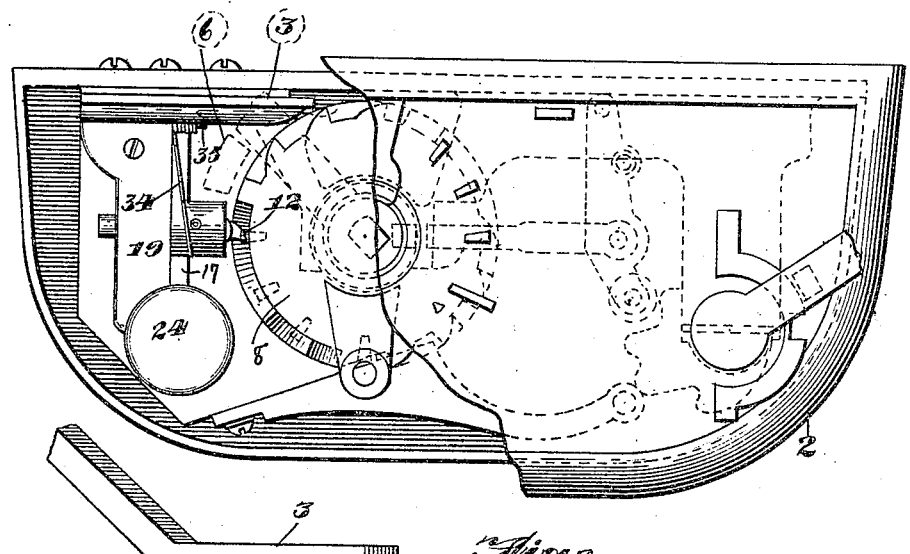
Figure 2:
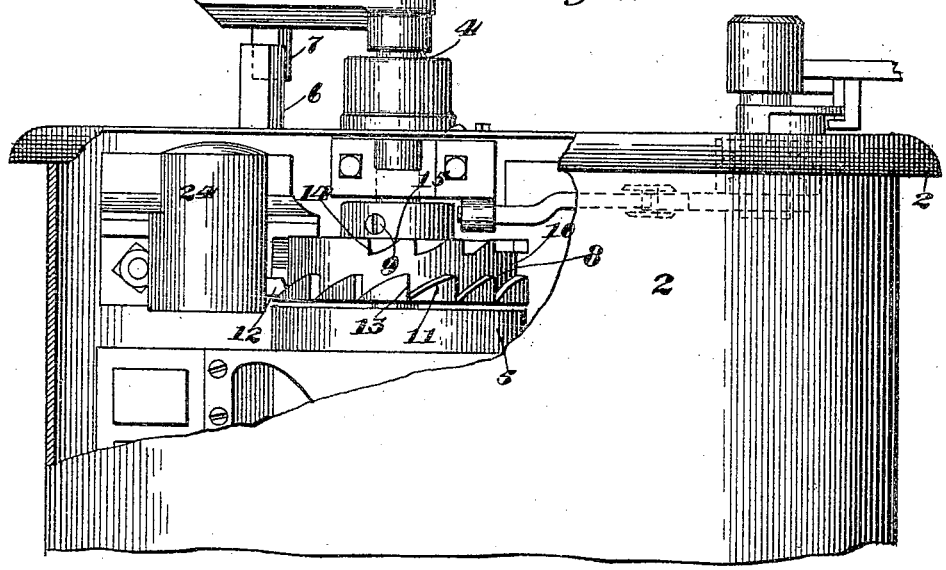
Figure 3:
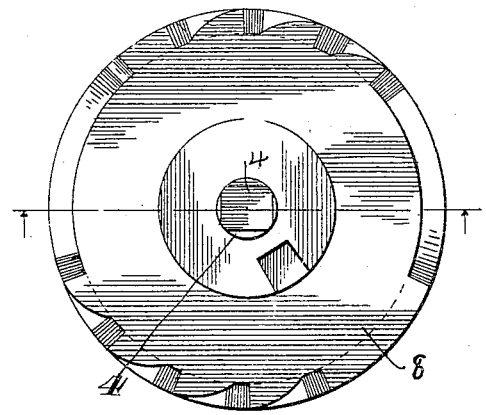
Figure 4:
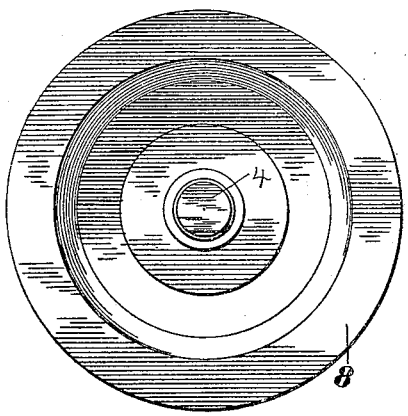
Figure 5:
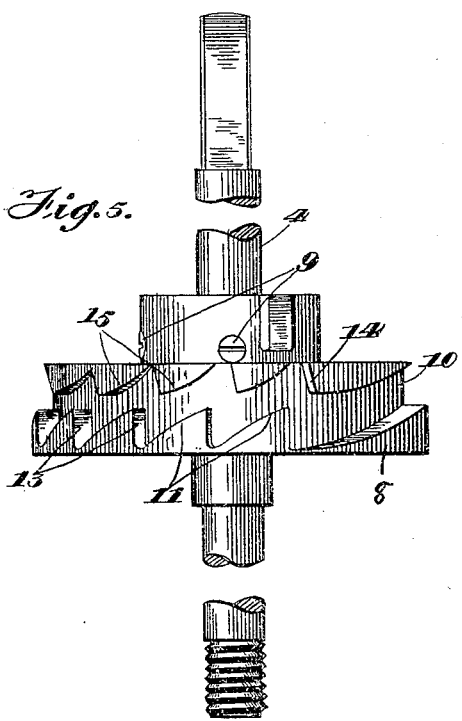
Figure 6:
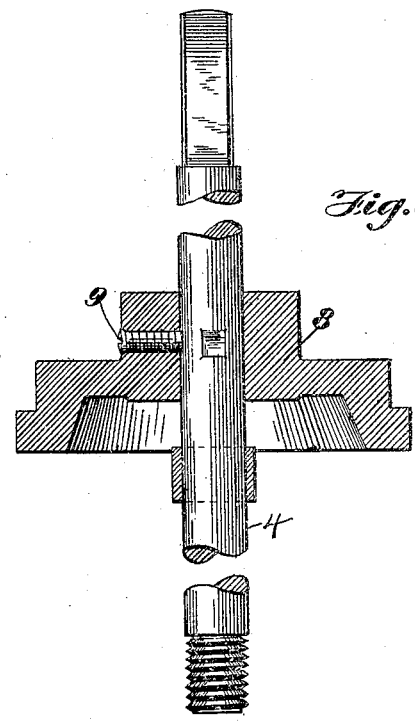

In the accompanying drawings, in which the same reference characters indicate like parts throughout the several views, Figure 1 is a plan view of a controller with regulator attached embodying my invention. Fig. 2 is a side elevation of the same, part of the casing being broken away. Figs. 3 and 4 are respectively top and bottom plan views of the regulator-wheel. Figs. 5 and 6 are respectively side and sectional elevations of the same. Fig. 7 is a side elevation of the pivoted dog with its controlling dash-pot. Fig. 8 is a sectional view of the said dog. Fig. 9 is a plan view of the same. Fig. 10 is a detail view of the piston of the dash-pot, and Fig. 11 is a plan view of the same.

In the figures the numeral 2 represents the usual casing of a street-car controller, 3 being the handle or crank of the same, which is carried upon the upper end of shaft 4 of the controller-roller 5, all in the usual manner. The normal stop 6 is mounted on the cover of the casing, against which the usual stop 7, carried upon the handle 3, engages when the handle is in normal position.

The usual marking-lugs occur upon the top of the casing, which indicate the amount of the resistance cut out of the circuit as the handle is turned, and the ordinary reversing and interlocking mechanism is indicated at the right in Figs. 1 and 2, all of which may be of the usual or desired type and are not specifically described, as they form no part of the invention.

A wheel or disk 8 is secured to the controller-shaft 4, as by set-screws 9 passing through its hub and engaging flattened portions of the shaft, and is provided at its periphery with a zigzag channel, slot, or groove 10, having preferably the form shown, in which the portions 11 of the lower edge of the slot form inclined cam-surfaces, up which the dog 12 slides as the wheel 8 is rotated in the operation of the handle 4, said cam portions 11 being connected by the substantially vertical portions 13. The upper edge of the zigzag slot has the stop or ratchet portions 14, against which the dog 12 strikes in the rotation of the wheel 8, said stop portions being connected by the inclined parts 15, which limit the possible upward movement of the said dog and confine it within the groove 10. As shown in Fig. 3, these cam and stop surfaces occur at short intervals throughout portions of the periphery and at longer intervals at others, so that the proper movement of the controller may take place. Any arrangement, however, of these stops and inclined surfaces may occur, so that the desired operation of the controller can be secured.

The dog 12 is mounted to reciprocate in a bore 16, provided in an enlargement formed midway between the ends of the lever 17, pivoted at 18 upon a casting 19, forming a frame or support for the lever 17 and its coöperating parts and secured by suitable screws or bolts passing through apertures 20 20, &c., to the flat face or wall of the casing 2. A pin 21 in the rear end of the dog 12 works in a slot in the end of the said enlargement and serves to prevent rotation of the dog 12 as well as to limit its outward movement. It likewise forms a bearing for the coiled spring 22, placed between it and a ridge formed upon the said enlargement, the spring serving to urge the dog outwardly. The end of the dog has its upper and lower edges beveled to correspond somewhat to the slope of the inclined portions of the slot 10 in wheel 8. The front of the dog is inclined slightly to agree with the stop portions 14 of the upper edge of the slot, which are substantially normal to the inclined portions of the slot, although they may be disposed at any desired angle, but preferably at an angle less than the angle of friction. The stop portions 14 are placed far enough back of the vertical portions 13 of the lower edge to permit the dog to readily drop when the pressure is relieved upon the handle of the controller. When the controller-handle is turned, the dog follows in the groove, sliding up the inclined portions, and, if the movement of the handle is rapid, striking against the stops 14, but dropping again as soon as the pressure is relieved from the handle 3, and thus permitting the further rotation of the handle, wheel, and controller.

The dog 12 is rounded off at its reverse edge 23, so that when the handle is returned to normal position and the wheel 8 reversely rotated the curved part 23 will cause the dog to slide back against the tension of the spring 22 out of the groove 10, thus permitting a ready and quick return of the handle to normal position.

In order that the action of the dog in its vertical movement may be properly governed and made positive, a dash-pot is provided, the cylinder 24 for which is formed at the outer end of the casting 19. A closely-fitting piston 25 for the cylinder is provided with a transverse aperture 26, in which the rounded end 27 of the dog-lever 17 projects. The piston 25 is furnished with a port or passage 28, which may be permanently adjusted to the right size by the screw 29, while a similar passage 30 and screw 31 are provided in the walls of the cylinder. A flat-headed bolt 32 passes through an aperture in the wall of the piston and is furnished with a spring 33 to maintain the aperture closed. This valve may be manually operated to permit the ready manipulation of the piston.

A spring 34 is carried upon pin 35 of the casting 19 and bears at its inner end against the flange of the casting and at its outer end against the enlargement of the lever 17, whereby a downward pressure is exerted on the lever. When, therefore, the handle of the controller is rotated in the "on" direction, the end 27 of the lever 17 raises the piston of the dash-pot until the dog 12 strikes the stop 14 of the wheel. The dog then instead of dropping at once is allowed to gradually descend by the retarding action of the dash-pot, whereby the rate of operation of the controller-handle may be regulated to any desired extent. The movement of the piston in the cylinder may be regulated as stated. The controller may be returned to normal position without hindrance, for the dog 12 merely rides over the top of the teeth or projections on the periphery of the wheel. The strain upon the dog is taken up by the casting and does not bind the dash-pot piston, in the lower end of which the end of the lever 12 loosely rides. All operating parts are protected by the casting, so that the same cannot be unwarrantably tampered with.

While I have described one particular construction for carrying out my invention, it is apparent that various modifications and changes may be made therein, and I therefore do not wish to be limited in all respects to the precise details shown; but

What I claim, and desire to secure by Letters Patent, is—

1. In a controller-regulator, the combination with operating means for said controller, a series of stops, a movable dog, and a series of cams to move said dog into engagement with said stops said dog being laterally movable, whereby when the controller is moved in one direction the dog will ride over the stops and not engage the same.

2. In a controller-regulator, the combination with operating means for said controller, of a series of stops, a movable dog, a series of cams to move said dog into engagement with said stops, and means to move said dog out of engagement with said stops said dog being laterally movable, whereby when the controller is moved in one direction the dog will move over said stops and not engage the same.

3. In a controller-regulator, the combination with operating means for said controller, a series of stops, a movable dog, a series of cams for moving said dog into engagement with said stops, means for moving said dog out of engagement with said stops, and means for retarding the action of said dog in said latter-mentioned movement.

4. In a controller-regulator, the combination with operating means for said controller, a series of stops, a movable dog, a series of cams for moving said dog into engagement with said stops, means for moving said dog out of engagement with said stops, and a dash-pot for retarding the action of said dog in said latter-mentioned movement.

5. In a controller-regulator, in combination, operating means for said controller, a series of stops, a movable dog normally out of engagement with said stops, and a series of cams for moving said dog into engagement with said stops when the controller is operated in one direction, said dog being permitted to remain out of engagement with the stops when the controller is operated in the reverse direction, whereby said dog permits only an intermittent movement of said controller in one direction but a continuous movement thereof in the reverse direction.

6. In a controller-regulator, in combination operating means for said controller, a series of stops, a movable dog normally out of engagement with said stops, and a series of cams for moving said dog into engagement with said stops when the controller is operated in one direction, said dog being permitted to remain out of engagement with the stops when the controller is operated in the reverse direction whereby said dog permits only an intermittent movement of said controller in one direction, but a continuous movement thereof in the reverse direction, and means for governing the time said dog may remain in engagement with said stops.

7. In a controller-regulator, in combination, operating means for said controller, a series of stops, a movable dog normally out of engagement with said stops, a series of cams for moving said dog into engagement with said stops when the controller is operated in one direction, said dog being permitted to remain out of engagement with the stops when the controller is operated in the reverse direction, and means for releasing said dog from engagement with said stops, whereby said dog permits only an intermittent movement of said controller in one direction but a continuous movement thereof in the reverse direction.

8. In a controller-regulator, in combination, operating means for said controller, a series of stops, a movable dog normally out of engagement with said stops, a series of cams for moving said dog into engagement with said stops when the controller is operated in one direction, said dog being permitted to remain out of engagement with the stops when the controller is operated in the reverse direction, means for releasing said dog from engagement with said stops, and means for controlling the release of said dog from said stops, whereby said dog permits only an intermittent movement of said controller in one direction, but a continuous movement thereof in the reverse direction.

9. In a controller-regulator, the combination with a controller-operating means, of a wheel in association therewith and adapted to be rotated thereby, said wheel having a peripheral slot provided with cam portions and with stop portions, a movable dog coöperating with said slot portions in such manner as to permit only an intermittent movement of the controller in one direction, but a continuous movement thereof in the reverse direction, substantially as described.

10. In a controller-regulator, the combination with a controller-roller, of a wheel in association therewith and having a peripheral cam and stop-slot, and a dog coöperating with said slot to permit only an intermittent rotation of said roller in one direction but a continuous rotation thereof in the reverse direction, substantially as described.

11. In a controller-regulator, the combination with a controller-shaft, of a wheel mounted thereon having a peripheral cam and stop-slot, and a movably-mounted dog adapted to coöperate with said slot to permit only an intermittent movement of said wheel when operated in one direction but a continuous movement thereof when operated in the reverse direction, substantially as described.

12. In a controller-regulator, the combination with a controller-shaft, of a wheel mounted thereon having a peripheral cam and stop-slot, and a movably-mounted dog coöperating with said slot to cause an intermittent movement thereof in one direction when the same is operated and to permit a free movement thereof in the reverse direction, substantially as described.

13. In a controller-regulator, the combination with a controller, of a wheel in association therewith having a cam-slot in its periphery and rotated simultaneously with and by means of the controller-operating mechanism, a dog coöperating with said slot and means to govern the action of said dog to permit only an intermittent movement of the controller when operated in one direction but a continuous movement thereof, when operated in the reverse direction, substantially as described.

14. In a controller-regulator, the combination with a controller, of a wheel in association therewith having a cam-slot in its periphery and rotated simultaneously with and by means of the controller-operating mechanism, a dog coöperating with said slot, means to govern the action of said dog to cause an intermittent motion of the controller when operated in one direction, and further means to permit the free movement of said controller in the reverse direction, substantially as described.

15. In a controller-regulator, the combination with a controller-roller, of a wheel adapted to rotate therewith and having a periphery provided with inclined cam portions and with stop portions, a pivotal lever at the side of the wheel, a dog mounted thereon adapted to engage said cam and stop portions, and means to retard the action of said lever in a direction reverse to that imparted by the cam portions, whereby when the stops are engaged by the dog the movement of the wheel is arrested for an appreciable time, substantially as described.

16. In a controller-regulator, the combination with a controller-roller, of a wheel adapted to rotate therewith and having a periphery provided with inclined cam portions and with stop portions, a pivoted lever at the side of the wheel, a dog mounted thereon adapted to engage said cam and stop portions, and a dashpot to retard the movement of said lever in the direction opposite that in which it is moved by said cam portions, substantially as described.

17. In a controller-regulator, the combination with a controller-shaft, of a wheel in association therewith and having a peripheral slot provided with inclined steps in its lower edge and with stops in its upper edge in proximity to the upper ends of the inclined steps, a dog adapted to project into said slot and to ride up said steps as the wheel is rotated and to engage said stops, said dog being mounted in a vertically-movable member that is lifted thereby when raised by said inclined portions, and a dash-pot to prevent said member immediately dropping beneath said stops to the next inclined portions whereby an intermittent rotation of the wheel is caused, substantially as described.

18. In a controller-regulator, the combination with a controller-shaft, of a wheel in association therewith and having a peripheral slot provided with inclined steps in its lower edge and with stops in its upper edge in proximity to the upper ends of the inclined steps, a dog adapted to project into said slot and to ride up said steps as the wheel is rotated and to engage said stops, said dog being mounted in a vertically-movable member that is lifted thereby when raised by said inclined portions, and a dash-pot to prevent said member immediately dropping beneath said stops to the next inclined portions whereby an intermittent rotation of the wheel is caused in one direction, said dog being yieldingly pressed into said slot and being so formed that the wheel may be readily rotated in the reverse direction without hindrance, substantially as described.

19. In a controller-regulator, the combination with a controller-shaft, of a wheel in association therewith and having a peripheral slot provided with inclined steps in its lower edge and with stops in its upper edge in proximity to the upper ends of the inclined steps, a dog adapted to project into said slot and to ride up said steps as the wheel is rotated and to engage said stops, a lever in which said dog is carried, said lever having its bearing located to receive the thrust of the dog, a dash-pot to retard the drop of said lever and dog, and a loose connection between the movable element of said dash-pot and the lever, whereby all strain upon the dog is removed from said element and breakage or binding thereof is prevented, substantially as described.

20. In a controller-regulator, the combination with operating means for the controller, of a series of stops and a series of cams, a pivoted lever, and a dog mounted thereon and adapted to engage said cams and said stops.

21. In a controller-regulator, the combination with operating means for the controller, of a series of stops and a series of cams, a pivoted lever, a dog mounted thereon adapted to engage said cam and stop portions, and means to retard the action of said lever in a direction reverse to that imparted by said cam portions.

22. In a controller-regulator, the combination with operating means for the controller, of a series of stops and a series of cams, a pivoted lever, a dog mounted thereon and adapted to engage said cams and stops, and a dash-pot to retard the movement of said lever in the direction opposite to that in which it is moved by said cam portions.

23. In a controller-regulator, the combination with operating means for the controller, of a series of stops and a series of cams, a dog adapted to ride up said cams as the controller is operated and engage said stops, said dog being mounted on a vertically-movable member that is lifted thereby when raised by said cam portions.

24. In a controller-regulator, the combination with operating means for the controller, of a series of stops and a series of cams, a dog adapted to ride up said cams as the controller is operated and engage said stops, said dog being mounted on a vertically-movable member that is lifted thereby when raised by said inclined portions, and means to prevent said member from immediately dropping beneath said stops.

25. In a controller-regulator, the combination with operating means for the controller, of a series of stops and a series of cams, a dog adapted to ride up said cams and engage said stops as the controller is operated, said dog being mounted upon a vertically-movable member that is lifted thereby when raised by the inclined portions, and a dash-pot to prevent said member from immediately dropping.

26. In a controller-regulator, the combination with operating means for the controller, of a series of stops and a series of cams, a dog adapted to ride up said cams as the controller is rotated and engage said stops, said dog being movably mounted on a vertically-movable member that is lifted thereby when raised by said inclined portions, and a dash-pot to prevent said member from immediately dropping.

In witness whereof I have hereunto subscribed my name in the presence of two witnesses.

CYRUS P. EBERSOLE.

Witnesses:
   J. V. E. TITUS,
   LUCRETIA MATHENEY.